UNITED STATES PATENT OFFICE.

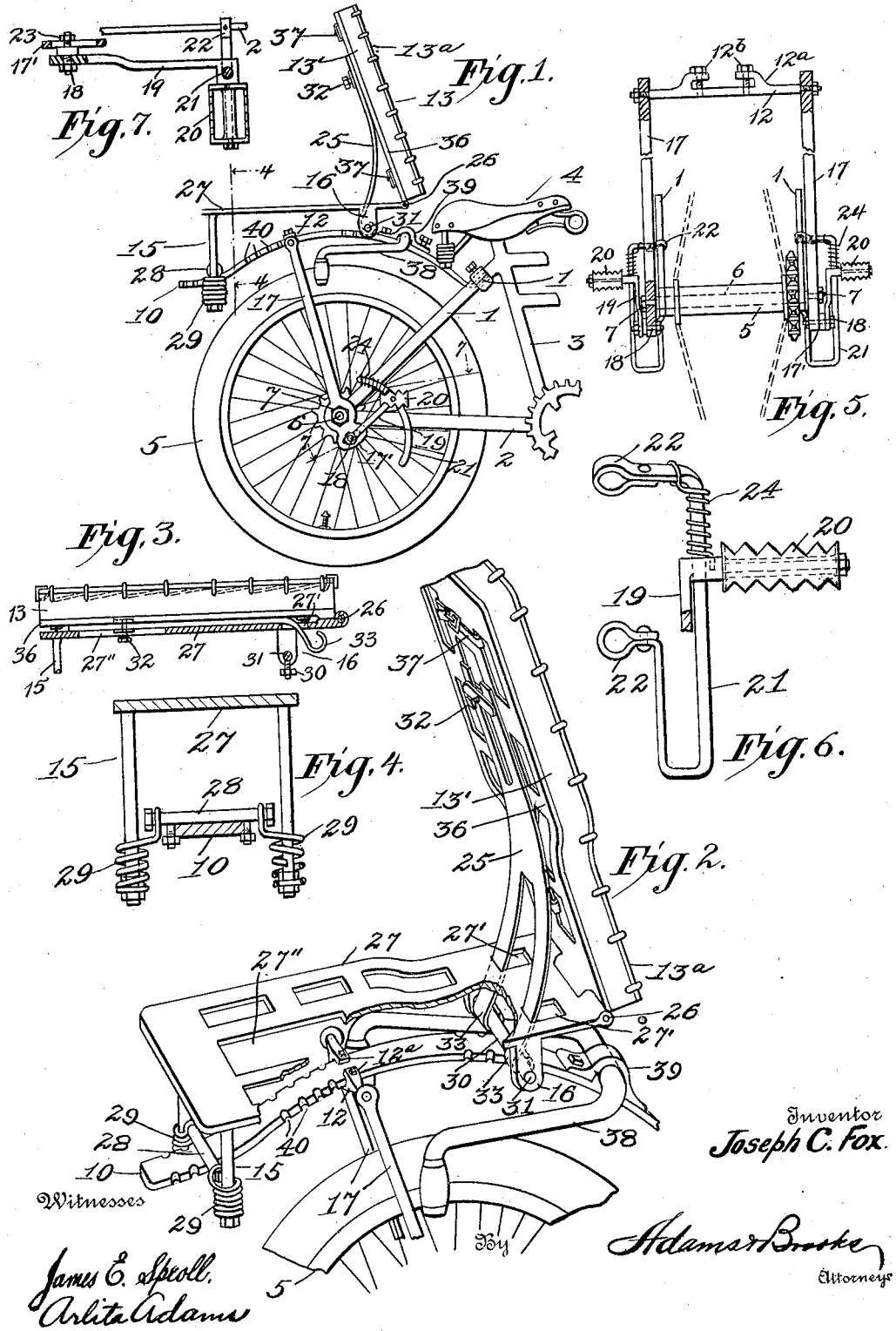

JOSEPH C. FOX, OF SEATTLE, WASHINGTON.

SUPPLEMENTAL SEAT ATTACHMENT FOR MOTOR-CYCLES AND THE LIKE.

1,102,899.     Specification of Letters Patent.     Patented July 7, 1914.

Application filed December 7, 1910. Serial No. 596,124.

*To all whom it may concern:*

Be it known that I, JOSEPH C. FOX, a citizen of the United States of America, and a resident of the city of Seattle, in the county of King and State of Washington, have invented certain new and useful Improvements in Supplemental Seat Attachments for Motor-Cycles and the like, of which the following is a specification.

My invention relates to devices of the above type adapted to be secured to the frame of a motor cycle, bicycle or the like, and has for a fundamental object the provision of a novel arrangement of parts wherein the seat is yieldingly supported.

A further object resides in the provision of an adjustable seat with means for securing the same as adjusted. With the above and other objects in view, to be referred to as my description progresses, my invention resides in the features of construction, arrangements and combinations of parts hereinafter described and succinctly defined in my annexed claims.

Referring to the accompanying drawings, wherein like numerals of reference indicate like parts throughout: Figure 1 is a side elevation of a portion of a bicycle frame having my invention applied thereto. Fig. 2 is a fragmentary perspective of the invention, the seat being adjusted, as in Fig. 1, to form a back for the main seat of the machine. Fig. 3 is a fragmentary sectional view, illustrating more particularly the auxiliary seat in lowered position. Fig. 4 is a section taken on line 4—4 of Fig. 1. Fig. 5 is a fragmentary vertical section illustrating more particularly the adjustable fulcrum and the means for supporting the same on the rear axle of the machine. Fig. 6 is a detail view of one of the foot rest guides, and Fig. 7 is a section taken on line 7—7 of Fig. 1.

For the purpose of illustration I have shown my invention applied to a bicycle or motor cycle frame, including the back fork 1, in which is mounted a wheel 5, chain stays 2, and a down tube 3 in which the pillar of the seat 4 is mounted, said wheel being mounted for rotation on an axle 6, fixed to the lower portion of fork 1 by nuts 7, all of which can be of any well known or desired construction.

My invention comprises a support including a lever member 10 having an adjustable fulcrum or bearing 12, by which a variable leverage can be obtained with a resultant increase or decrease in the cushioning tension under which the auxiliary seat 13 is maintained. An extremely simple construction results through the provision of a lever member 10 which in itself is of elastic construction, and for such reason I form this member of a suitable length of spring sheet metal and removably secure its forward end portion, as by a clamp 11, to fork 1, such forward end portion being curved upwardly and engaged at its free end portion by clamp 11, as clearly shown in Fig. 1.

Fulcrum or bearing 12 engages member 10 at an intermediate point and is adjustable lengthwise thereof to vary the length of the projecting free rear portion, for reasons hereinbefore set forth, on which rear portion the seat has bearing through a connection 15, to thereby impose thereon the weight or the preponderance of weight of the rider, the latter statement being particularly true in this the preferred embodiment of my invention, inasmuch as mainly for the purpose of stability, I provide an additional connection 16 between the seat and said lever member forwardly of fulcrum 12.

Reference numeral 17 indicates spaced rigid uprights mounted for rotary adjustment on the end portions of axle 6, and having fulcrum or bearing 12 mounted on their upper end portions for free rocking movement thereon, whereby weight imposed on the rear end portion of lever member 10 tends to bow upwardly that portion of the lever member forwardly of fulcrum or bearing 12, this being permitted by the upper end portions of uprights 17 springing forward slightly, and further, through the yielding of such forward portion of member 10. Therefore, that portion of the lever member 10 between the points of connection 15 and 16 has a slight swinging movement, rocking with fulcrum or bearing 12 on uprights 17, and such lever can be rendered more or less sensitive for rocking movement through weight of a rider imposed thereon by varying the length of its projecting rear end portion, which is effected through adjustment of fulcrum or bearing 12 lengthwise of the lever member. To prevent any vertical shifting of lever member 10 during adjustment of fulcrum 12 in its arc like path, I curve in concentric relation that portion of lever member 10 engaged thereby, as clearly shown in Fig. 1.

Depending from uprights 17 are extensions 17' to which arms 19 are pivoted, as by pintles 18, for swinging eccentrically to wheel 5, these arms carrying suitable foot rests 20 and being slidably engaged with vertical guides 21, secured, as by clamps 22 to fork 1 and stays 2. To compensate for adjustment of upright members 17, arms 19 have slotted connection therewith, pintles 18 being adjustably held in suitable slots of extensions 17' by nuts 23 opposing centrally located shoulders of the pintles, as clearly shown in Fig. 7.

In mounting foot rests 20, as just described, I am enabled to lift the same when their use is not required, and thereby overcome all danger of the operator being injured through contact of his heels therewith. Springs 24 serve to return foot rests 20 to and hold the same in their elevated or positions of non-use.

In my present construction I mount auxiliary seat 13 in a novel manner, whereby it can, as desired, be set upwardly to serve as a back for main seat 4, in which position it is held by a rearwardly disposed brace 25.

With this end in view, auxiliary seat 13 is hinged, at its forward edge, to a carrier 27, with which connections 15 and 16 are directly engaged, these connections conveniently consisting of respective pairs of depending lugs, the former of which are in the form of threaded stems, and having a yielding connection with their related clamp 28 through springs 29, while the latter are journaled directly on the end portions of the cross bar of a clamp 30.

Clamps 28 and 30 which can be of any desired construction, are shown as consisting of cross bars engaged on the upper face of lever member 10 and having depending pins, provided on their threaded lower end portions with nuts, as shown, the said pins being adapted to be seated in any of the notches of respective series, the rear series of which are formed in the longitudinal edge portions of the rear end portion of member 10 which is substantially horizontal, whereby a lengthwise adjustment of carrier 27 can be effected without disturbing the set thereof in a vertical direction.

Brace 25 has its lower end releasably connected with the horizontal cross bar of clamp 30 held in depending bracket arms of carrier 27 and has its upper end slotted for reception of a threaded stem, the latter receiving a clamping nut and forming in conjunction therewith a clamp 32 for holding the seat and brace against relative movement. As now considered, the lower end portion of brace 25 is bifurcated and these furcations project through slots 27' in carrier 27 and receive support in a rearward direction from the back walls thereof, and have their projecting portions bent to form hooks 33 which are releasably engaged with cross bar of clamp 30, these hooks being so shaped that their release can be effected after brace 25 is swung forwardly slightly past normal position, said brace being then forced downwardly, subsequently to its release from clamp 32, after clearing which, it can, with the carrier still held in its forwardly disposed position, be elevated above said cross bar of clamp 30, then adjusted to the position shown in Fig. 3, whereby its bifurcated end portion will lie over said clamp cross bar, during swinging of the seat to its horizontal position, in which the projecting parts of clamp 32 will be received in a slot 27'' of the carrier.

A convenient mode of hinging seat 13 to carrier 27, as hereinbefore described, consists in removably securing the seat to a suitable frame 36, by the flexible connections 37, which frame and carrier 27 are of plate sections hinged at their forward edge portions, as at 26, which engagement permits of carrier 27 being employed as a parcel support, when the seat is swung upwardly.

Reference numeral 38 indicates the auxiliary handle bars conveniently held on lever member 10, forwardly of seat 13, as by a clamp 39.

Fulcrum or bearing 12, as now considered, comprises a cross bar provided with angle lugs 12$^a$ embracing the side edge portions of lever member 10, and carrying lock pins 12$^b$ adapted for insertion in suitable notches 40, of said lever member as clearly shown.

Having thus described my invention what I claim as new, and desire to secure by Letters Patent of the United States of America, is:

1. A supplemental seat attachment for bicycles and the like including a seat support comprising a lever member adapted to be connected to the frame of the machine, an adjustable fulcrum for said lever member, and a seat mounted on said lever member to move therewith in its swinging movement.

2. A supplemental seat attachment for bicycles and the like including a seat support comprising a lever member adapted to be connected at one end portion to the frame of the machine and having its opposite end portion free for vertical movement, a seat mounted on the last named end portion of said lever member, and a fulcrum for said lever member adapted to be mounted on the frame of the machine for adjustment toward and from the last named end portion of said member.

3. A supplemental seat attachment for bicycles and the like including a seat support comprising a lever member adapted to be connected at one end to the frame of the machine and having its opposite end portion free for vertical movement, a seat mounted on the last named end portion of said lever, a fulcrum for said lever, and means for supporting said fulcrum for adjustment lengthwise of said lever, said means being adapted to be mounted on the axle of the rear wheel of the machine for rotary adjustment thereon.

4. A supplemental seat attachment for bicycles and the like including a seat support consisting of a spring metal member adapted to be secured at one end to the frame of the machine, a seat mounted on the opposite end portion of said member, and a bearing for said member engaged therewith intermediate its ends and adjustable lengthwise thereof.

5. A supplemental seat attachment for bicycles and the like including a seat support consisting of a spring metal member adapted to be connected at one end portion to the frame of the machine, a seat connected with said member for adjustment lengthwise thereof, and a bearing for said member engaged therewith intermediate its ends.

6. A supplemental seat attachment for bicycles and the like comprising a spring metal member curved for a portion of its length substantially concentrically to the rear wheel of the machine and adapted to be connected at one end portion to the frame of the machine, an adjustable bearing engaged with the curved portion of said member, a supporting means for said bearing adapted to be mounted on the axle of the rear wheel of the machine for rotary adjustment, and a seat connected to said member at one side of said bearing.

7. A supplemental seat attachment for bicycles and the like comprising an auxiliary seat, with supporting means therefor, and auxiliary foot rests pivotally supported for vertical swinging movement.

8. A supplemental seat attachment for bicycles and the like comprising an auxiliary seat, with supporting means therefor, auxiliary foot rests supported on said means for relative vertical movement, and spring means for normally holding said foot rests elevated.

9. A supplemental seat attachment for bicycles and the like comprising a seat supporting member, means for attaching one end portion of said member to the frame of the machine, a seat connected with said member, a bearing for said member, a support for said member adapted to be mounted on the rear axle of the machine for rotary adjustment, and a pivoted arm carrying a foot rest and having slotted connection with said support, for the purpose specified.

10. A supplemental seat attachment for bicycles and the like comprising a seat, supporting means therefor, and foot rests mounted on said means for relative angular movement.

11. In a device of the character described, in combination with the rider's seat of a bicycle or the like, a seat for a second rider arranged at the rear of said first seat, and means pivotally supporting said second seat for vertical movement to an angular position at the rear of said first seat to thereby constitute a back therefor.

12. In a device of the character described, in combination with the rider's seat of a bicycle or the like, a parcel carrier arranged at the rear of said seat, supporting means for said parcel carrier, a second seat normally extending over said parcel carrier, and means supporting said second seat for adjustment upwardly from said parcel carrier to an angular position at the rear of said first seat to thereby constitute a back therefor.

13. In a device of the character described, in combination with the rider's seat of a bicycle or the like, a parcel carrier arranged at the rear of said seat, supporting means for said parcel carrier, a second seat normally extending over said carrier and supported thereby, and means supporting said second seat for adjustment upwardly from said parcel carrier to an angular position at the rear of said first seat to thereby constitute a back therefor.

14. In a device of the character described, in combination with a rider's seat of a bicycle or the like, a parcel carrier, arranged at the rear of said seat, a second seat pivotally mounted on the forward portion of said parcel carrier for movement to a vertical position at the rear side of said first seat, said parcel carrier comprising an elongated member forming a bearing surface for the free portion of said second seat when the latter is in lowered position, and means for supporting said parcel carrier.

15. In a device of the character described, in combination with the rider's seat of a bicycle or the like, a parcel carrier, arranged at the rear of said seat, a second seat pivotally mounted on the forward portion of said parcel carrier for movement to a vertical position at the rear side of said first seat, said parcel carrier comprising an elongated member forming a bearing surface for the free portion of said second seat when the latter is in lowered position, means for supporting said parcel carrier, and a brace for holding said second seat elevated extending upwardly from said parcel carrier at the rear side of said seat and engaged with the latter.

16. In a device of the character described, in combination with the rider's seat of a bicycle or the like, a parcel carrier, arranged at the rear of said seat, a second seat pivotally mounted on the forward portion of said parcel carrier for movement to a vertical position at the rear side of said first seat, said parcel carrier comprising an elongated member forming a bearing surface for the free portion of said second seat when the latter is in lowered position, means for supporting said parcel carrier, and a brace of resilient construction for holding said second seat elevated extending upwardly from said parcel carrier at the rear side of said seat and releasably connected with the latter.

17. In a device of the character described, in combination with the rider's seat of a bicycle or the like, a parcel carrier, supporting means for said carrier holding the latter at the rear of said seat, a second seat pivotally supported on said carrier for upward movement from over the face thereof to a vertical position at the rear side of said first seat to thereby form a back therefor, and a brace releasably engaged with said second seat and extending through said parcel carrier and having its lower end portion releasably connected with said supporting means.

18. In a device of the character described, in combination with the rider's seat of a bicycle or the like, a parcel carrier, supporting means for said carrier holding the latter at the rear of said seat, a second seat pivotally supported on said carrier for upward movement from over the face thereof to a vertical position at the rear side of said first seat to thereby form a back therefor, and a resilient brace releasably engaged with said second seat and extending through said parcel carrier and having its lower end portion hook shaped and releasably connected with said supporting means.

19. In a device of the character described, in combination with the rider's seat of a bicycle or the like, a seat for a second rider arranged in spaced relation relatively to said first seat, and means supporting said second seat for adjustment of the latter to an angular position at the rear of said first seat to thereby constitute a back therefor.

20. A supplemental seat attachment for bicycles and the like comprising a resilient seat supporting member adapted to be connected at one end to the frame of the machine, a bearing engaged with said supporting member intermediate the ends thereof and adjustable lengthwise of the member, means for supporting said bearing, and a seat mounted on said member and connected therewith at opposite sides of said bearing.

21. A supplemental seat attachment for bicycles and the like comprising a support adapted to be fastened to the frame of the machine, and a seat adjustably mounted on said support for movement to an angular position at the rear of the seat of the machine to thereby constitute a back therefor.

22. An attachment for motor cycles or the like comprising a support adapted to be fastened to the frame of the vehicle, a carrier frame mounted on said support, a seat hinged to said frame and adapted to be swung up to form a back for the ordinary seat of the vehicle, and means to support said seat in raised position.

23. An attachment for motor cycles or the like comprising a support adapted to be fastened to the frame of the vehicle, a seat hinged to said support and adapted to be swung up to form a back, and means to hold said seat in raised position.

24. An attachment for motor cycles or the like comprising a support adapted to be fastened to the frame of the vehicle over the rear wheel thereof, an auxiliary seat pivotally connected with said support and adapted to be swung up to form a back for the ordinary seat of the vehicle, and means for yieldingly holding said auxiliary seat in raised position.

Signed at Seattle, Washington this 10" day of November 1910.

JOSEPH C. FOX.

Witnesses:
A. A. BARTH,
ARLITA ADAMS.

---

Copies of this patent may be obtained for five cents each, by addressing the "Commissioner of Patents, Washington, D. C."